Feb. 20, 1951 L. B. FINK 2,542,405
BEARING
Filed Dec. 11, 1947

Inventor
L. B. Fink
By Glascock Downing & Seebold
Attorneys

UNITED STATES PATENT OFFICE 2,542,405

BEARING

Lawrence B. Fink, Faith, N. C.

Application December 11, 1947, Serial No. 790,981

1 Claim. (Cl. 308—237)

This invention relates to bearings and has for its object the provision of a bushing or a liner which is adjustable as to size in such manner that in applying the bearing to new or worn shafts a precise and accurate fit may be obtained with convenience and facility.

A further object of the invention is the provision of a bushing which, although affording desirable advantages as to adjustability and precision of fit, is highly economical both as to cost of production and use.

A still further object is the provision of a bushing composed substantially of a main or body part and a plurality of thin laminations of predetermined thickness applied thereto and capable of being removed as by peeling or stripping until the bushing assumes the proper size to be determined by accurate measurement of the shaft to which it is to be fitted.

Figure 1:
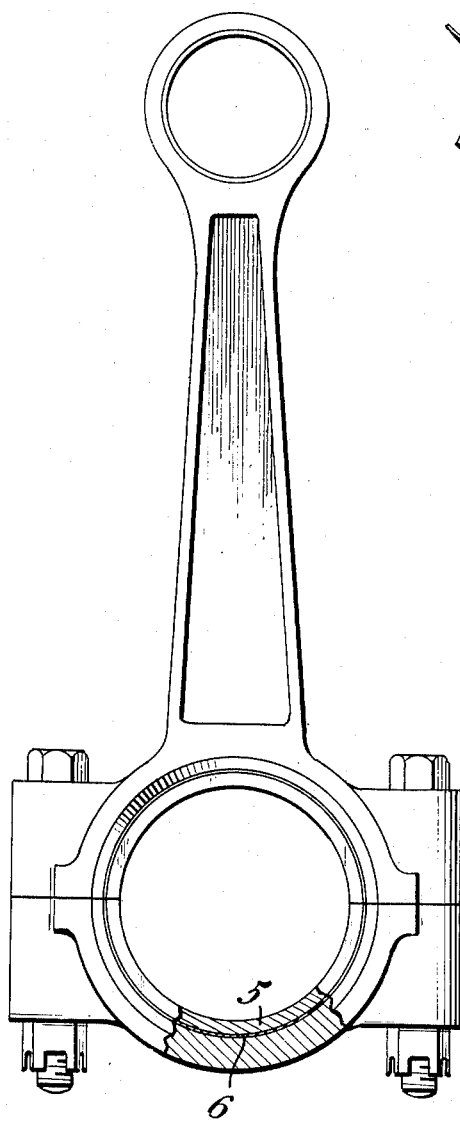
Figure 2:
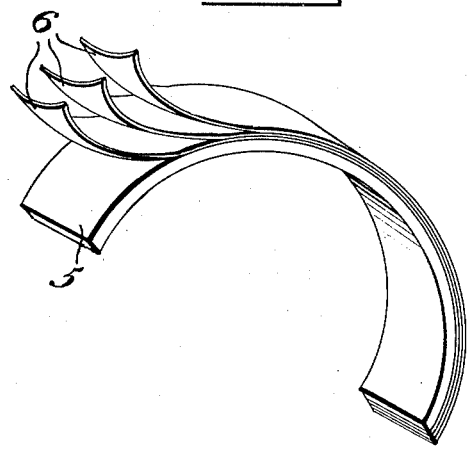
Figure 3:
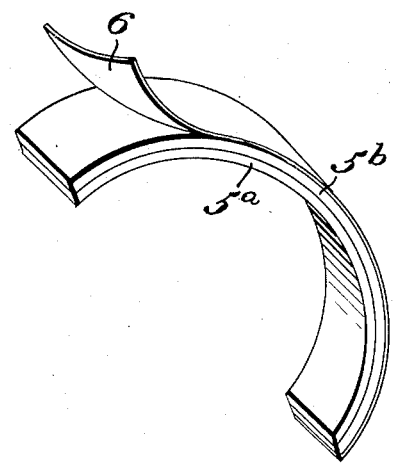

In the accompanying drawing wherein several preferred embodiments of the invention are illustrated:

Figure 1 is an elevation partly broken away of a conventional connecting rod showing the invention applied thereto, Figure 2 is a fragmentary perspective view showing one form of the adjustable bushing, and Figure 3 is a similar view of a second form.

Referring to the drawing in detail, the bushing consists essentially of the body portion 5 and a plurality of laminations 6 formed of thin material such, for example, as metal secured or bonded to one another and to the body portion by a metallic base cement or other adhesive material, The attachment of the laminations is not permanent but such that one or several or all may be peeled or stripped off so as to reduce the bushing to the size required.

The body portion may consist of one piece of Babbitt metal or other bearing material as shown in Figure 2 with which the laminations are bonded or the body portion may be composed of two parts as shown in Figure 3. In this latter embodiment the part 5a is formed of bearing material and the part 5b of harder material such as steel, to the inner facing of which the bearing material 5a is facially bonded and to the outer face of which the laminations 6 are attached.

Bushings for the bearings of connecting rods, crank shafts, and other machine parts are supplied commercially in different sizes for use in fitting them to new and worn shafts. The sizes ordinarily supplied are usually referred to as "standard size" in which the conventional bushings are in undersizes such as minus .010, .020, .030 inch and so on. In fitting a bearing or making a replacement the mechanic removes the cap of the old bearing and measures the shaft for size. Assuming that it is found to be reground to an undersize of .020 and further assuming that the shaft is found to have been worn to .002 of an inch below standard, it is evident that a bearing of .022 undersize is required.

According to the invention the laminations 6 are of a thickness of .001 inch and after the selection of a standard size bushing for an undersize shaft of .020 the mechanic strips off all except one of the laminations from the backs of two companion bushings, thereby leaving only one lamination in place. The improved bushing with the single lamination will, when applied, provide a bearing .022 undersize. In this manner the reduction in the size of the shaft of .002 of an inch due to wear is compensated by the provision of the retained circular lamination of .001 thickness and a bearing having a fit of high precision is thus obtained.

The foregoing is merely given by way of example and it will be understood that bushings in various other sizes may be readily supplied for different purposes to suit the use to which they are to be put. For ordinary purposes it has been found sufficient to use four or five laminations for each part of the bushing but if found desirable this number may be either increased or decreased. By virtue of the present improvement it is only necessary for the mechanic to maintain in stock a relatively small number of bearings which may be accurately fitted to a wide variety of conditions which may be presented.

It is also evident that the form of the bushing may be varied to meet different requirements such, for instance, as in certain cases it may be found desirable to form the bearing with lateral flanges for engagement with the side faces of the bearing body and cap. It has also been found desirable in manufacturing the improved bushings to form them of somewhat greater length than required. In this case the bushing is inserted in the cap of the bearing and the ends trimmed off to the proper length so that it will fit firmly and squarely in place. The bushing thus fitted is removed from the cap and inserted in the bearing and thereafter the bushing which is to remain in position in the cap is fitted therein in a like manner and the assembly of the parts of the bearing is effected.

What I claim is:

A composite adjustable bushing for bearings comprising two semi-cylindrical sections each including an inner body portion of bearing material, each inner body portion constituting a bushing section of standard size, and a plurality of laminations each having a thickness of the order of 0.001 inch adhesively secured to the outside of each body portion in such manner that they can be selectively stripped off to produce, when applied to a split bearing support, a bearing which is undersize as compared with the said standard size.

LAWRENCE B. FINK.

REFERENCES CITED

The following references are of record in the file of this patent:

UNITED STATES PATENTS

| Number | Name | Date |
| --- | --- | --- |
| Re. 14,315 | Orban | June 12, 1917 |
| 700,014 | Buck | May 13, 1902 |
| 1,347,443 | Christiani | July 20, 1920 |
| 1,656,125 | Neuenfelt | Jan. 10, 1928 |
| 1,736,998 | Darrach | Nov. 26, 1929 |
| 2,316,119 | Bagley | Apr. 6, 1943 |